United States Patent
Allen

(10) Patent No.: US 9,326,484 B2
(45) Date of Patent: May 3, 2016

(54) FLUID CLEANING DEVICE

(75) Inventor: Donavan J. Allen, Greer, SC (US)

(73) Assignee: Albert W Gebhard, Denver, CO (US)

(*) Notice: Subject to any disclaimer, the term of this patent is extended or adjusted under 35 U.S.C. 154(b) by 264 days.

(21) Appl. No.: 13/465,734

(22) Filed: May 7, 2012

(65) Prior Publication Data

US 2013/0292497 A1  Nov. 7, 2013

(51) Int. Cl.

| B05B 1/06 | (2006.01) |
|---|---|
| B05B 1/14 | (2006.01) |
| B05B 1/18 | (2006.01) |
| B05B 1/26 | (2006.01) |
| B05B 1/28 | (2006.01) |
| A01K 13/00 | (2006.01) |
| B05B 1/30 | (2006.01) |

(52) U.S. Cl.
CPC ............... *A01K 13/001* (2013.01); *B05B 1/18* (2013.01); *B05B 1/3026* (2013.01)

(58) Field of Classification Search
CPC ............. B05B 1/14; B05B 1/18; B05B 1/26; B05B 1/262; B05B 1/265; B05B 1/28
USPC .............. 239/104, 121, 288.5, 461, 499, 504, 239/520, 521, 523, 543, 544, 548, 558, 559, 239/567, 17, 20, 27, 28; 119/604
See application file for complete search history.

(56) References Cited

U.S. PATENT DOCUMENTS

| 1,895,307 A * | 1/1933 | Beck ........................ B05B 1/18 239/498 |
| 2,545,951 A * | 3/1951 | Frese ................. A62C 99/0027 169/11 |
| 2,985,178 A * | 5/1961 | Christensen, Jr. ............ 134/149 |
| 3,058,670 A * | 10/1962 | Marotto et al. ............ 239/428.5 |
| 4,209,132 A * | 6/1980 | Kwan .................... A61H 23/04 239/381 |
| 4,509,545 A * | 4/1985 | Trotter ......................... 134/199 |
| 4,779,572 A * | 10/1988 | Freulon ........................ 119/604 |
| 4,836,702 A | 6/1989 | Allen |
| 4,912,782 A * | 4/1990 | Robbins ........................... 4/678 |
| 4,991,314 A | 2/1991 | Allen |
| 4,995,749 A * | 2/1991 | Gornik ............................. 401/9 |
| 5,170,943 A * | 12/1992 | Artzberger ............ E02F 3/9206 137/625.27 |
| 5,297,739 A * | 3/1994 | Allen ..................... A46B 17/06 239/530 |
| 5,722,349 A | 3/1998 | Wolgamuth |
| 6,109,214 A | 8/2000 | Rampersad |
| 6,463,943 B1 | 10/2002 | Monroe |
| 6,553,941 B2 * | 4/2003 | Porter ........................... 119/665 |
| 6,827,039 B1 | 12/2004 | Nelson |

(Continued)

OTHER PUBLICATIONS

International Search Report for International Application No. PCT/IB2013/053476, which claims priority from U.S. Appl. No. 13/465,734, mailed Aug. 26, 2013.

(Continued)

*Primary Examiner* — Arthur O Hall
*Assistant Examiner* — Joseph A Greenlund
(74) *Attorney, Agent, or Firm* — Polson Intellectual Property Law, PC; Margaret Polson

(57) ABSTRACT

An apparatus and process for impinging a fluid upon an object to be treated is described. A generally conical-shaped flow of fluid is directed from the cleaning device onto a surface. The fluid contacts the surface and then is reflected through an opening defined by the device and against a deflection plate. The deflection plate has a shape configured to direct the fluid into a fluid return and back onto the surface to be treated.

17 Claims, 4 Drawing Sheets

(56) References Cited

U.S. PATENT DOCUMENTS

| | | | |
|---|---|---|---|
| 6,948,451 B2 | 9/2005 | Bond et al. | |
| 7,111,798 B2* | 9/2006 | Thomas | B05B 1/1663 239/114 |
| 7,988,070 B1* | 8/2011 | Yang | B05B 1/18 15/24 |
| 8,016,215 B1* | 9/2011 | Zhadanov | B05B 1/185 239/536 |
| 8,028,935 B2* | 10/2011 | Leber | B05B 15/067 137/345 |
| 8,616,470 B2* | 12/2013 | Williams | E03C 1/0409 137/801 |
| 2004/0217209 A1* | 11/2004 | Bui | B05B 1/1654 239/548 |
| 2006/0153625 A1 | 7/2006 | Embry | |
| 2007/0246577 A1 | 10/2007 | Leber | |
| 2010/0065665 A1* | 3/2010 | Whitaker | B05B 1/1636 239/562 |
| 2010/0143024 A1 | 6/2010 | Hurwitz | |
| 2013/0292497 A1* | 11/2013 | Allen | A01K 13/001 239/548 |

OTHER PUBLICATIONS

Written Opinion for International Application No. PCT/IB2013/053476, which claims priority from U.S. Appl. No. 13/465,734, mailed Aug. 26, 2013.

\* cited by examiner

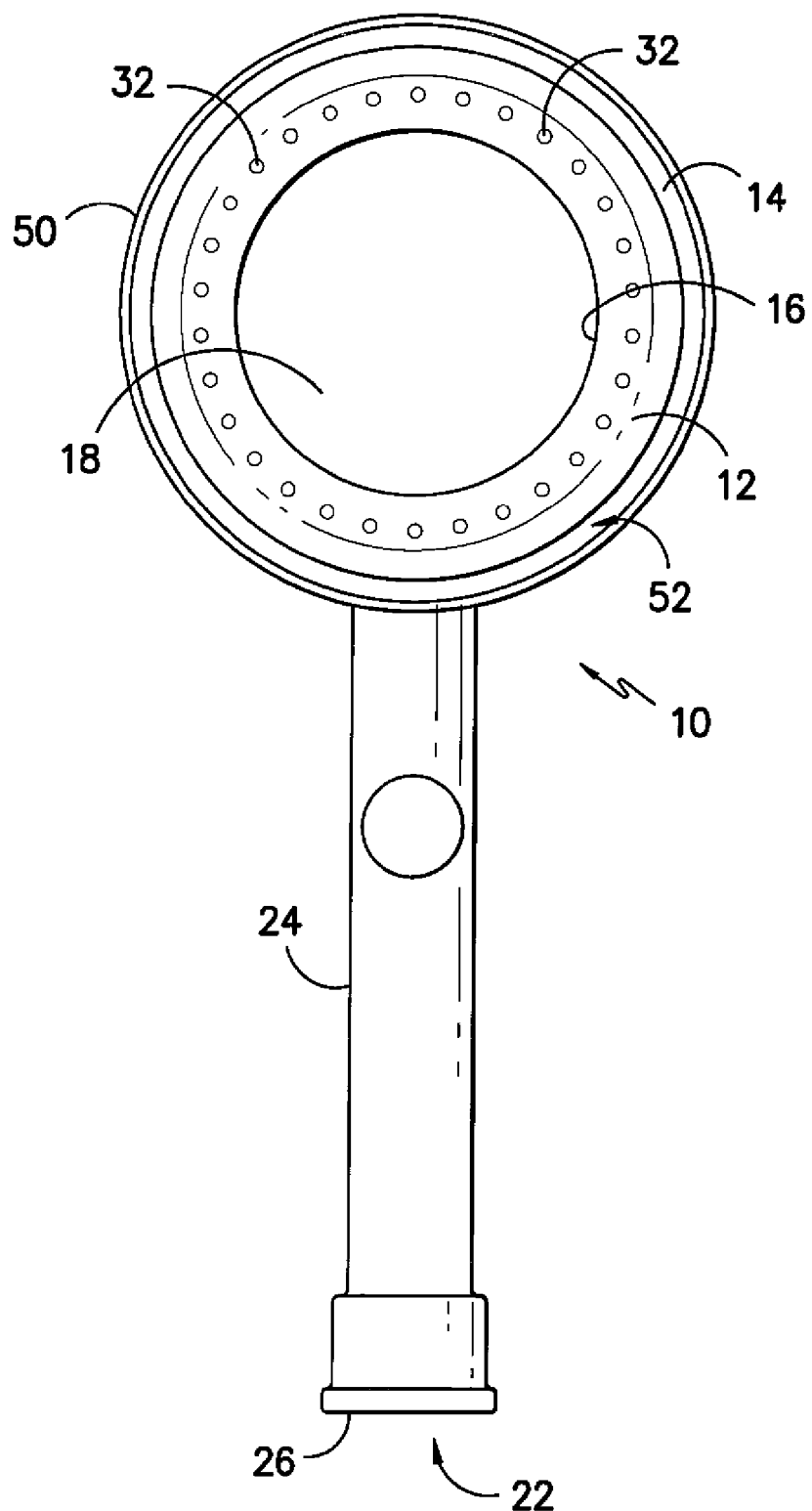
FIG. -1-

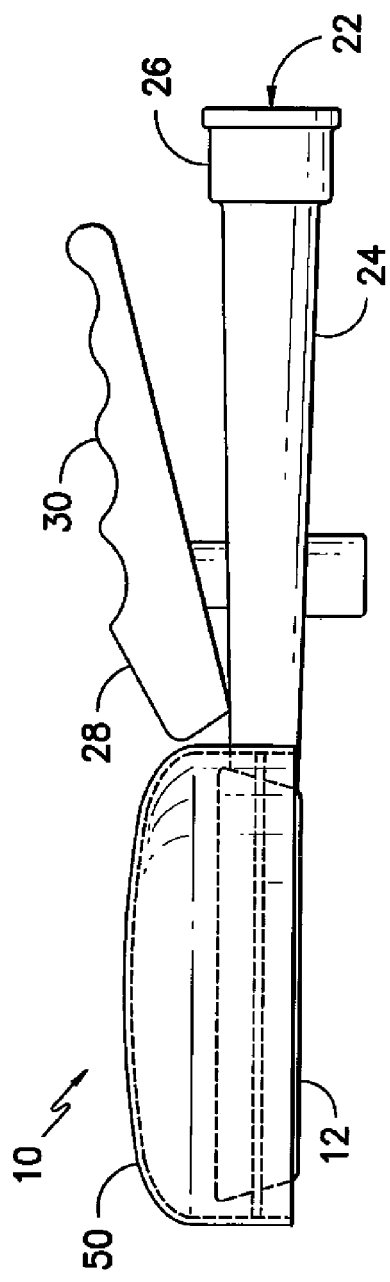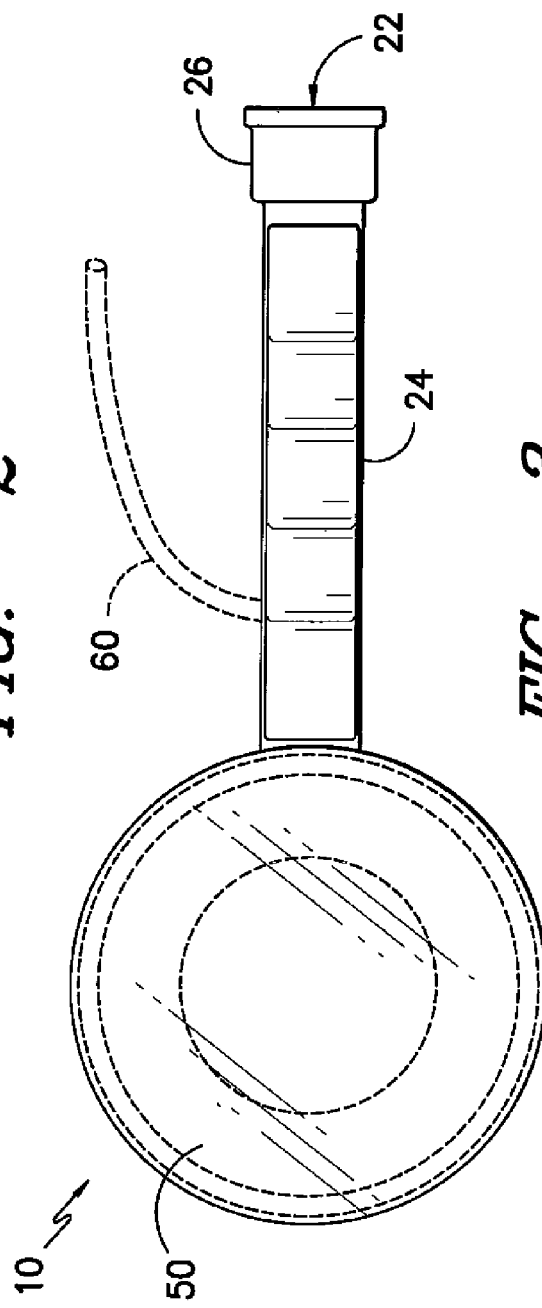

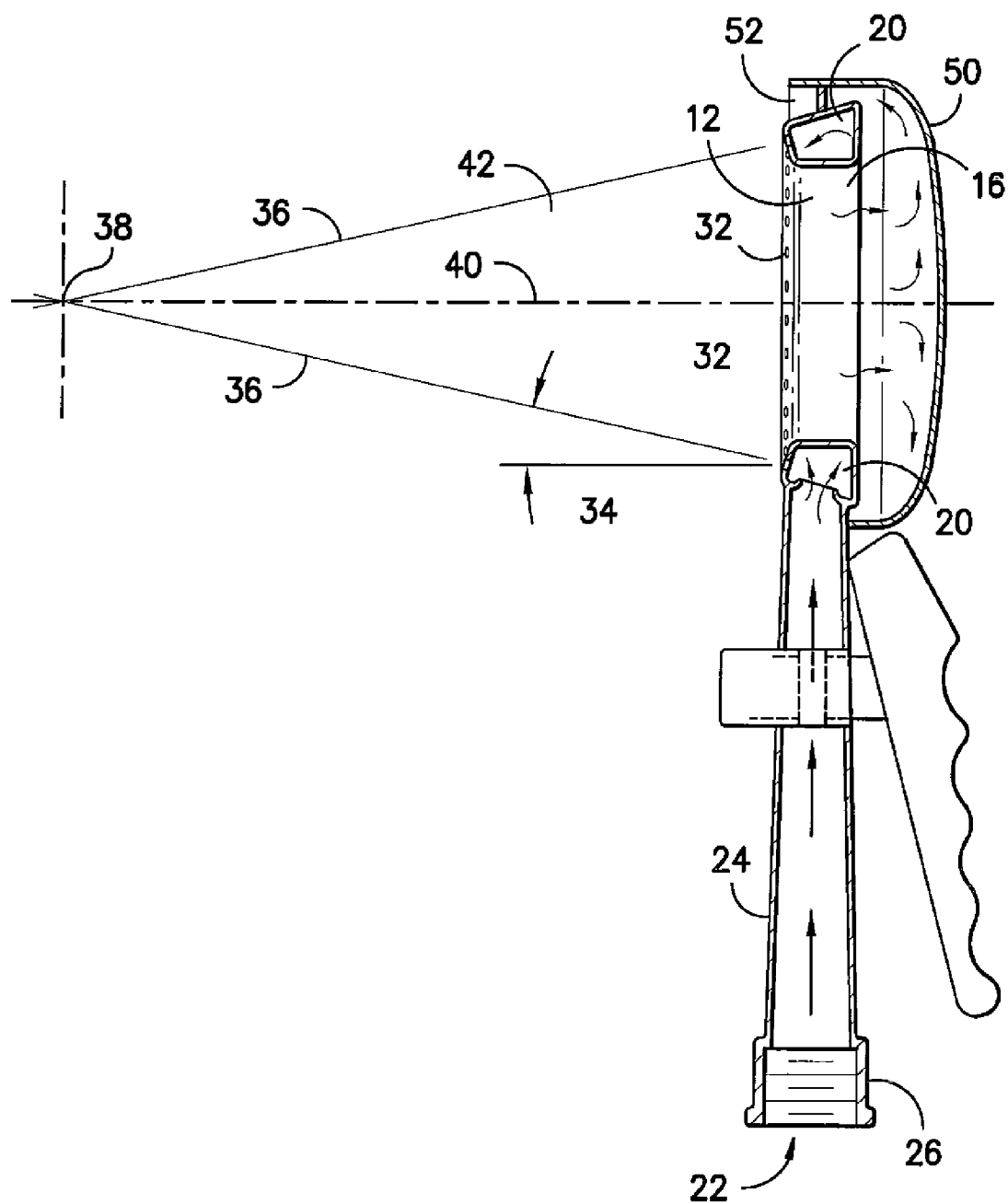
FIG. -4-

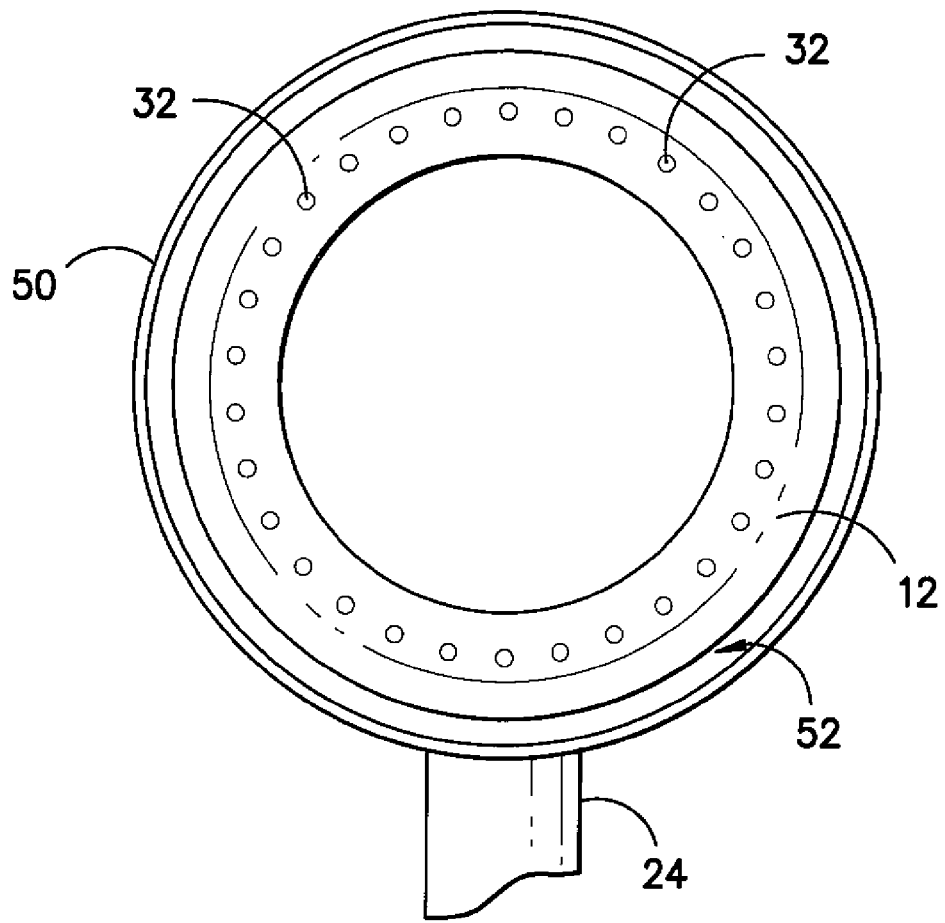
FIG. -5-
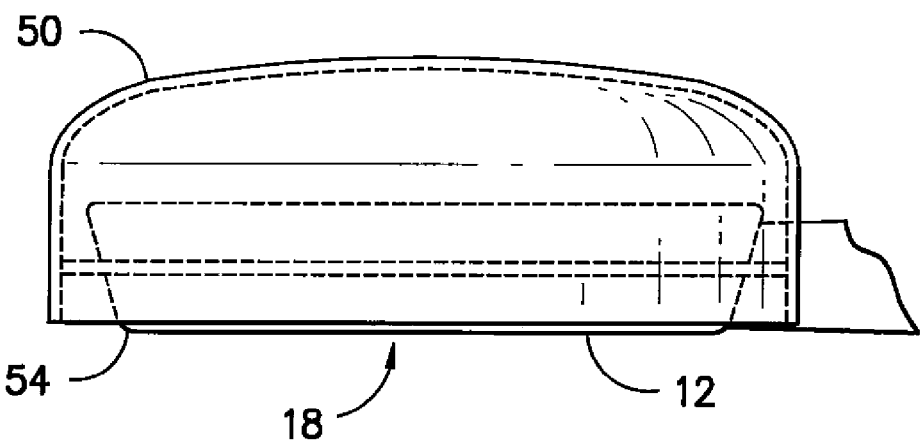
FIG. -6-

FLUID CLEANING DEVICE

BACKGROUND

Washing a pet's fur can be a laborious process. An animal's coat tends to accumulate dirt and other particulates, which get entangled and matted into the fur. For this reason it is ordinarily not sufficient to merely impinge water upon their coat, but instead some sort of scrubbing is required to loosen and release the dirt and other particulates which have become entangled in the pet's fur.

Various devices for cleaning a pet's fur that allow for simultaneous scrubbing and application of a cleaning fluid and/or water have existed within the prior art. U.S. Pat. No. 5,722,349 to Wolgamuth, for example, is directed to a hand pet washing system that includes at least one resilient rubber glove, a rubber tubing secured to the glove for carrying soap and water for washing, and a valve secured at the end of the tubing for controlling the soap and water flow. The hand pet washing system disclosed in U.S. Pat. No. 5,722,349 is for facilitating washing of an animal without the user being in personal contact with harsh shampoos utilized on the animal.

U.S. Pat. No. 6,109,214 to Rampersad discloses a pet grooming mitt. The mitt has a built-in reservoir with discharge ports and massage nibs for pet grooming.

In U.S. Patent Application Publication No. 2006/0153625, a pet bathing product for shampooing or bathing pets is described. The device includes a distribution head that is attached to a hose. The device further includes an additive reservoir that allows for the sudsing of a pet coat directly through the product.

Various fluid flow apparatuses are also disclosed in U.S. Pat. No. 4,836,702, U.S. Pat. No. 4,991,314, and U.S. Pat. No. 5,297,739, which are all incorporated herein by reference. The '739 patent, for instance, discloses an apparatus and process for impinging a fluid upon an object to be treated. A generally conical-shaped flow of fluid is directed against an object to be treated. More particularly, the object to be treated is located so that fluid impinging on the object reflects upwardly and has a lifting effect on filamentary material, such as hair, bristles, or fibers. In one embodiment, the device disclosed in the '739 patent is incorporated into a blow dryer. Such devices have shown great commercial success and have provided many advancements in the art.

A need still remains, however, for a device that is particularly well suited to washing a fibrous or filamentary material, such as the fur of an animal.

SUMMARY

The present disclosure is generally directed to an apparatus and method for impinging a fluid upon an object to be treated. The apparatus, for instance, is particularly well suited to scrubbing the fur of an animal, such as a pet. As will be described in greater detail below, the apparatus can be designed to produce a substantial turbulent scrubbing action for efficiently cleaning an animal's fur without a user having to manually scrub the fur. Of particular advantage, the apparatus also is capable of not only dispensing a cleaning fluid, such as water, onto an animal's fur, but also disperses the cleaning fluid without creating significant amounts of collateral splashing or spray that would otherwise wet the user or the surrounding environment.

In one embodiment, for instance, the present disclosure is directed to an apparatus for dispensing a fluid. The apparatus includes a tubular body having a circular shape defining an opening therethrough. The tubular body includes a fluid passageway for receiving a cleaning fluid, such as water. A plurality of fluid orifices are located on the first side of the tubular body and are in fluid communication with the fluid passageway. The fluid orifices are positioned around the opening defined by the body in a circular array which is substantially symmetrical about an axis passing through the center of and perpendicular to the opening. The fluid orifices can be angularly arranged such that fluid passing through the orifices forms a substantially conical pattern in a first direction.

The apparatus further includes a deflection plate positioned over the tubular body on a side of the body that is opposite the fluid orifices. A fluid return is in fluid communication with the deflection plate.

The apparatus further includes a fluid inlet in communication with the fluid passageway contained in the tubular body. Fluid entering the inlet flows into the fluid passageway and is emitted out the fluid orifices. Upon striking a surface to be cleaned, the fluid is reflected through the opening defined by the body, against the deflector plate, and out the fluid return.

In one embodiment, the fluid orifices can be equally spaced around the opening defined by the body. The fluid orifices may be arranged at an angle of from about 15° to about 45° relative to the center axis. In one particular embodiment, for instance, the fluid orifices may be arranged at an angle at approximately 25° relative to the center axis. The number of fluid orifices contained on the body can vary depending upon the overall size of the apparatus and the particular application. In one embodiment, for instance, the apparatus can include from about 10 to about 40 fluid orifices. The fluid orifices can be positioned such that a fluid flowing through the orifice forms a conical pattern that converges towards a common plane and then diverges away from the plane thereafter.

The deflection plate that is positioned over the tubular body can have various shapes. In one embodiment, for instance, the deflection plate comprises a dome that substantially encircles the tubular body. For example, the deflection plate can include a surface that defines a curvature for directing fluid into the fluid return. The fluid return may comprise a channel that is substantially concentric with the tubular body.

The apparatus of the present disclosure may further include a handle that defines a fluid passageway that is in fluid communication with the fluid inlet. The handle, for instance, may include a means for attaching the handle to a hose. In one embodiment, the apparatus can include a user-activated valve for opening and closing fluid flow through the tubular body.

In one embodiment, the fluid passageway contained within the tubular body may have a first inlet and a second inlet. The first inlet may be configured to be attached to a water supply, such as a hose. The second inlet, on the other hand, may be configured for connection to a cleaning agent, such as a detergent or soap.

Other features and aspects of the present disclosure are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 1 is a bottom view of one embodiment of an apparatus for dispensing a fluid in accordance with the present disclosure;

FIG. 2 is a side view of the apparatus illustrated in FIG. 1;

FIG. 3 is a top plan view of the apparatus illustrated in FIG. 1;

FIG. 4 is a cross-sectional view of the apparatus illustrated in FIG. 1;

FIG. 5 is an enlarged bottom view with cutaway portions of the apparatus illustrated in FIG. 1; and FIG. 6 is a side view with cutaway portions of the apparatus illustrated in FIG. 1.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to an apparatus and method for dispensing a fluid. The apparatus, for instance, directs a fluid onto a surface to be treated. The surface being treated, for instance, may comprise a filamentary material. The apparatus of the present disclosure is particularly well suited for cleaning and/or rinsing such surfaces with a liquid. The apparatus, however, is also well suited to treating a surface with a gas, such as heated air. As will be described in greater detail below, the apparatus efficiently and thoroughly cleans items formed of or covered with bristles, hair, fur or similar nappy fibrous material, both woven and nonwoven. In one particular embodiment, the apparatus can be used to clean pet fur without having to expend a significant amount of physical effort to scrub or otherwise clean the fur.

Jet streams, emitted through a plurality of orifices positioned in a circular array on the apparatus, lift, separate and otherwise manipulate the contacted material, drawing it into a cavity defined by the fluid deflection plate and the inner surface of a toroidal tube, providing a significant scrubbing action to accomplish thorough cleaning or rinsing. This scrubbing action when used on a pet's fur liberates dirt and other particulates from the hair, allowing the liquid to wash them away more easily without mechanical scrubbing by the user. The action also provides the same enhanced cleaning effect when used on any items formed of or covered with bristles, hair, fur or similar nappy fibrous material, both woven and non-woven, including the head and scalp of humans. When used on other types of surfaces, such as the exterior of a car, the fluid deflection plate can reduce water waste by redirecting water that splashes backwards. For instance, the water is redirected back towards the surface to be rinsed, contacting the surface of the car more than once.

in one embodiment, the cleaning process is effectively and conveniently monitored as it proceeds. Areas of the surface being treated are readily identified and the overall process is rapidly expedited. Use of the device provides an easy and quick way to clean not only pet fur, but paint brushes and rollers, reducing the mess and frustration typically associated with this task.

The following description is of the fluid mechanics and resulting effects thereof associated with the apparatus of the instant invention.

Upon connection to a pressurized water source, such as a residential yard spigot and hose, and upon opening of a valve, a torus and connecting straight tube fill with water at inlet pressure. The static pressure of the contained water is converted to velocity pressure at the orifice discharge openings, and the velocity of the issuing jets is determined by Torricelli's theorem.

Due to the geometry of the array of orifices with respect to that of the torus, the issuing jets form a hollow right circular cone of spray, the base of the cone being of the same diameter as that of the orifice array, and the conical axis coinciding with the toroidal axis, i.e., perpendicular to the principal face of the torus tube. The individual water jets coincide at a point being the apex of the cone, on the toroidal axis; in other words, the jets can be focused symmetrically to a point.

When the apparatus is applied to a cleaning or rinsing operation, it is held with the principal face parallel to the surface to be cleaned or rinsed (herein referred to as the "target surface"), hence the conical spray axis is generally perpendicular to the target surface. The distance separating the work surface and the toxoid can, in one embodiment, be less than the height of the spray cone which would develop in free flow; therefore, the jets impinge on the target surface in the shape of a circular ring.

Hence, each individual jet has a component of momentum perpendicular to the target surface and a component parallel to it as well. When viewed from the base of the spray cone, each parallel component of momentum is directed towards the center or the axial point of focus. As an individual jet strikes the target surface, it is reflected backward toward the torus and at the same time inwardly toward the conical axis. As a result, the reflected jets all converge toward the conical axis. Geometrically, the shape of the flow is that of a hollow right circular cone, truncated at the area of impact with the target surface, and with the truncated conical tip being reversed in direction so as to point back along the conical axis toward the principal face of the torus (perpendicular to and away from the target surface).

There are three main effects produced by the converging jets as they impact and reflect off of the target surface. First, the bristles, hairs or individual strands of target media become entrained in the liquid jets and are forced to lift away from ("stand up" upon) the target surfaces. This exposes the roots and base of the media to being wetted by the washing liquid. Rather than being compressed by liquid impact into a tangled dense mat, the target media strands tend to be isolated and lifted upright from the target surface to which they are connected, greatly increasing the strands' exposure to wetting.

Second, by the same effect, the roots and base of the media are exposed to the kinetic energy of the jets, allowing particles of paint, dirt, shampoo and other deposits to be dislodged and flushed away by the reflected jet streams.

Third, a considerable amount of fluid turbulence is created as the jets are reflected and interact dynamically with the strands of uplifted target media. Particularly as the torpid is moved in an oscillatory manner parallel to the target surface and coupled with a slight reciprocating motion along the conical spray axis perpendicular to the target surface, the intensity and patterns of turbulence vary considerably. This causes a great "scrubbing action". The strands of media are forced into a waving or swaying motion as they continue to stand upright in the reflected liquid, stream, and this enhances the cleaning or rinsing action by further dislodging particulate matter from the media strands.

The amount of scrubbing action created by the device can be varied by moving the device towards and away from the surface being cleaned. In one embodiment, for instance, the device can be placed very close to the surface being cleaned such that the strands of media or filaments not only are forced into an upright configuration, but may also impact against the deflection plate which may further enhance the cleaning action. Moving the device farther away from the surface concentrates the streams at a particular location. When the device is moved yet further away from the surface, more of a rinsing action occurs.

In addition to the above, once the jets have contacted the target surface, the liquid is reflected off the target surface and directed back through an opening formed in the apparatus and against the deflection plate. After striking the deflection plate, the liquid is then directed into a fluid return which, in one embodiment, may comprise a fluid channel that is concentric with the conical spray pattern. From the fluid return, the liquid is once again directed back onto the target surface. In this manner, the fluid not only strikes the target surface with a scrubbing action motion as described above, but also strikes the target surface again to provide further rinsing and washing. The deflection plate also prevents the cleaning fluid from splashing and contacting the user or splashing and wetting the environment in which the target surface is being cleaned. Thus, the apparatus not only serves to scrub the target surface but also does so with minimal fluid waste and without creating any significant collateral splashing or spraying.

The overall effects of the fluid mechanics peculiar to this device are to physically lift entrained solids and the like away from the media to be cleaned, from the base of the fibers outward, by direct transfer of momentum; to separate tangles and eliminate matting of the media which occurs in other types of cleaning methods; to thoroughly wet, clean and rinse the entire length of the media through the induced turbulence and reflected flow characteristic of the jet pattern; to accomplish the cleaning operation very efficiently, that is, through the expenditure of less time and consumption of water or cleansing liquid than is required in other methods.

In another embodiment for fluid treatment or rinsing, the apparatus is moved farther away from the target surface. In this manner, the orifices are arranged so that the flow will converge to a common plane and then diverge away from the common plane. The effects in the converging region are as set out above and the flow in the diverging region provides a broader and less turbulent rinsing action. Further, splash is reduced in the region where the flow changes from converging to diverging compared to the embodiment where the flow converges to a focal point.

In addition to emitting a liquid for cleaning and rinsing surfaces, the apparatus of the present disclosure may also be used in conjunction with a gas, such as heated air. The apparatus, for instance, may be incorporated into a blower assembly for drying hair or for any other suitable application. When used to emit a gas, the nozzles may also be angled so that the resulting fluid flow may create a vortex.

Referring to FIGS. 1 through 6, one embodiment of an apparatus made in accordance with the present disclosure is shown. The apparatus comprises a fluid cleaning device 10 for dispensing a fluid, such as a liquid or a gas. As described above, the cleaning device 10 is particularly well suited for cleaning filamentary material, such as the fur of a pet.

As shown in FIG. 1, the cleaning device 10 includes a circular toroidal tube 12 having an outer surface 14 and an inner surface 16. The inner surface 16 defines an opening 18. The toroidal tube 12 has a tubular body and defines a fluid passageway 20 therein which is particularly shown in FIG. 4. The fluid passageway 20 connects to a fluid inlet 22 which is surrounded by, in this embodiment, a handle 24. The handle 24 comprises a straight tube that connects with the fluid passageway 20 in a perpendicular manner. The handle 24 can include a threaded connection 26 for accepting a conventional male hose fitting for purposes of connecting the cleaning device with a source of fluid under pressure.

As shown particularly in FIG. 2, the cleaning device 10 can also include a manually activated valve 28. The valve 28 can include a valve actuator 30. In the embodiment illustrated in FIG. 2, for instance, the valve actuator 30 comprises a squeeze lever. By squeezing on the lever, for instance, the valve opens allowing fluid flow into the fluid passageway 20 defined by the toroidal tube 12. In the embodiment illustrated, the valve 28 can be biased in a closed position to prevent fluid flow into the fluid passageway 20.

Communicating with the fluid passageway 20 is fluid outlet means, comprising a plurality of orifices 32. The orifices 32 are disposed in a circular array and found on the face of the toroidal tube 12 about the inner surface 16. The circular array of the orifices is formed such that its center line is coincident with the center line of the face of the toroidal tube 12. The orifices 32 are disposed at an angle of disposition with respect to a stated reference line positioned within the toroidal tube 12. This angle of disposition of orifices 32 is best understood with reference to FIG. 4 of the drawings.

Referring to FIG. 4, for instance, with respect to the orientation of the cleaning device 10, the horizontal center line 34 of the circular cross section of the toroidal tube 12 coincident with an orifice 32 is the reference line for the specified angle of disposition which, in one embodiment, may be approximately 25° as shown in FIG. 4. The actual disposition angle, however, can vary depending upon the particular application. For instance, the angle can generally vary from about 15° to about 45° relative to the center axis.

At each pertinent position along the circular array of orifices, an orifice is disposed with respect to the center line 34 of its respective stated cross-section. That is, each orifice 32 is set normal to the circular cross-section of the toroidal tube 12, inclined off the principle axis of toroidal symmetry such that liquid flowing under pressure as indicated by lines 36 from within the toroidal tube 12, through orifices 32, forms a conical array of liquid jets which converge to a point 38 on a toroidal axis 40. The focusing of the plurality of liquid jets into a hollow conical zone 42 converges to the point 38 and provides the fluid-mechanical mechanism which increases the effectiveness of cleaning on a surface. The hollow conical zone 42, in one embodiment, can be used as the zone of cleaning by positioning a surface to be cleaned within the zone. During cleaning, the cleaning device 10 can be moved parallel to a surface being cleaned which, when contacting a fibrous surface, cause the fibers to lift and separate. The conical zone formed by the liquid jets penetrates and agitates the material. The scrubbing action flushes foreign particles from the surface.

In the attached figures, the tube 12 has a circular shape such that the orifices form a circular array. It should be understood, however, that any suitable shape may be used as long as the orifices are symmetrical about either a point or a plane. For instance, in other embodiments, the tube 12 may have a rectangular shape, a triangular shape, or any other suitable polygon-like configuration. The tube 12 may also be in the shape of an oval or any other suitable curved configuration. The orifices may be positioned completely around the perimeter of the tube 12 such that they focus at a particular point. Alternatively, however, the orifices may be disposed only at opposing sides such that they converge at a particular line or plane.

As particularly shown in FIGS. 2, 3 and 4, the cleaning device 10 further includes a deflection plate 50. The deflection plate 50, depending upon the particular application, can serve various purposes. For instance, once the conical zone of fluid jets contact a surface, the fluid reflects off the surface and is redirected through the opening 18 defined by the toroidal tube 12. After passing through the opening 18, the fluid then contacts the deflection plate 50. In this manner, the user does not get significantly splashed or wetted by the cleaning fluid during use of the device.

As shown particularly in FIGS. 1 and 4, the deflection plate 50, in one embodiment, can be concentric with the toroidal tube 12. The deflection plate 50 can also have a diameter that is greater than the outer diameter of the toroidal tube. In this manner, a fluid return 52 is formed in between the deflection plate 50 and the outer surface 14 of the toroidal tube 12. As shown in FIG. 1, in one embodiment, the fluid return 52 forms a channel inbetween the deflection plate 50 and the toroidal tube 12.

As shown in FIG. 4, the deflection plate 50 can have an interior surface that has a shape that directs fluid entering the opening 18 into the fluid return 52. For instance, the deflection plate 50 can have a curvature that directs fluid into the fluid return. In the embodiment illustrated in FIG. 4, the surface of the deflection plate 50 has a generally concave shape. In this manner, cleaning fluid that has already contacted the surface being cleaned is redirected back onto the surface through the fluid return 52. Redirecting the fluid back onto the surface can serve to saturate the surface being cleaned with the cleaning fluid and/or rinse the surface as it is being cleaned. Thus, not only does the deflection plate 50 prevent against collateral splashing, but also conserves the amount of cleaning fluid used during the cleaning operation.

As shown particularly in FIGS. 2 and 3, the deflection plate 50 can generally be in the shape of a dome. It should be understood, however, that the deflection plate 50 may include various other shapes.

Referring to FIGS. 4 and 6, a side view of the cleaning device is shown. As illustrated, in one embodiment, the deflection plate 50 can have a bottom edge 54 that may be positioned relative to the bottom surface of the toroidal tube 12. For instance, in the embodiment illustrated in FIG. 6, the bottom surface of the toroidal tube 12 extends beyond the bottom edge of the deflection plate 50. This arrangement may be desirable in some applications depending upon the flow pattern of the return fluid. Having the bottom edge 54 of the deflection plate 50 being positioned higher than the bottom surface of the toroidal tube 12 may, in some applications, prevent the return fluid from interfering with the jets being emitted from the orifices 32 and contacting the surface to be cleaned. In other embodiments, however, it should be understood that the bottom edge 54 may fall within the same plane as the bottom surface of the toroidal tube 12 or may extend beyond the bottom surface of the toroidal tube 12.

It is thus seen that the cleaning device 10 as shown in the figures provides a novel and effective apparatus and process for cleaning various filamentary material, such as pets, animals, paint brushes, paint rollers, carpets, and the like. The device can be made of readily available lightweight materials, such as plastic, and can be easily manipulated to conveniently monitor the cleaning process.

The particular dimensions of the cleaning device 10 can vary dramatically depending upon the particular application. Also, the number of orifices 32 that form the circular array around the opening 18 can also vary. In one embodiment, the cleaning device may include from about 10 to about 40 fluid orifices.

Referring to FIG. 3, in one embodiment, the cleaning device 10 may actually include a cleaning fluid passageway 60.

The cleaning fluid passageway can be placed in fluid communication with the fluid inlet 22 and the fluid passageway contained within the toroidal tube 12. The cleaning fluid passageway 60 is for providing a cleaning fluid to the device that mixes with the pressurized water and emitted through the orifices 32.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. An apparatus for dispensing a fluid from a pressurized fluid source for cleaning a desired surface comprising:
   a tubular body defining an opening therethrough, the tubular body including a first fluid passageway and having a first side and a second and opposite side;
   a plurality of fluid orifices positioned adjacent the opening in an array which is substantially symmetrical about an axis passing through the center of and perpendicular to the opening, the orifices being located on the first side of the tubular body and being in fluid communication with the first fluid passageway, the fluid orifices being angularly arranged such that fluid passing through the orifices forms a substantially symmetrical pattern in a first direction;
   a deflection plate positioned over the tubular body adjacent to the second side opposite the fluid orifices;
   a fluid return in communication with the deflection plate;
   a fluid inlet in communication with the fluid passageway contained in the tubular body, and wherein, fluid entering the inlet flows into the first fluid passageway and is emitted out the fluid orifices under pressure and then directly onto a surface external to the device, upon striking the surface external to the device, some of a fluid is reflected off a surface external to device and through the opening, against the deflection plate, and then a fluid flows out the fluid return and back on to a surface external to the device;
   wherein a path of a fluid through the fluid inlet and through the fluid passageway to the fluid orifices on the first side and out the fluid orifices cannot include the deflection plate or the fluid return; and
   wherein the deflection plate comprises a plate covering the opening and substantially encircles the tubular body and is positioned opposite the opening and spaced a distance from the second side of the tubular body.

2. An apparatus as defined in claim 1, wherein the fluid orifices are arranged at an angle of from 15° to 45° relative to the center axis.

3. An apparatus as defined in claim 1, wherein the fluid orifices are arranged at an angle at 25° relative to the center axis.

4. An apparatus as defined in claim 1, wherein the deflection plate defines a surface that has a curvature that directs fluid into the fluid return.

5. An apparatus as defined in claim 1, wherein the fluid return comprises a channel that is substantially concentric to the tubular body.

6. An apparatus as defined in claim 5, wherein the deflection plate defines a surface that has a curvature that directs fluid into the fluid return.

7. An apparatus as defined in claim 6, wherein the fluid orifices are arranged at an angle of from 15° to 45° relative to the center axis.

8. An apparatus as defined in claim 1, wherein the fluid orifices are equally spaced around the opening.

9. An apparatus as defined in claim 1, further comprising a handle, the handle defining a second fluid passageway that is in fluid communication with the fluid inlet.

10. An apparatus as defined in claim 9, wherein the apparatus further includes a user-activated valve for opening and closing fluid flow through the tubular body.

11. An apparatus as defined in claim 1, wherein the fluid orifices are positioned such that a fluid flowing through the orifices forms a conical pattern that converges towards a common plane and then diverges thereafter.

12. An apparatus as defined in claim 1, wherein the apparatus includes from between 10 to 40 fluid orifices.

13. An apparatus as defined in claim 8, wherein the apparatus includes from between 10 to 40 fluid orifices.

14. An apparatus as defined in claim 1, wherein the deflection plate comprises a dome that substantially encircles the tubular body, the fluid return comprising a channel defined between the deflection plate and the tubular body, the deflection plate having a bottom edge and wherein the first side of the tubular body extends beyond the bottom edge of the deflection plate.

15. An apparatus as defined in claim 1, wherein the deflection plate has a surface facing the opening of the tubular body, the surface having a concave shape.

16. An apparatus as defined in claim 1, wherein the deflection plate is disposed at a particular height above the opening defined by the tubular body such that fluids being emitted through the fluid orifices and being reflected off the surface are drawn into a cavity defined in between the deflection plate and the tubular body for being directed into the fluid return.

17. An apparatus as defined in claim 1, wherein the tubular body has a circular shape and wherein the fluid orifices form a circular array such that fluid passing through the orifices forms a substantially conical pattern.

* * * * *